United States Patent
Jennings

[11] Patent Number: 5,423,719
[45] Date of Patent: Jun. 13, 1995

[54] ABRASIVE TOOLS

[76] Inventor: Bernard A. Jennings, Plot 53, Laezonia, Transvaal, South Africa

[21] Appl. No.: 16,775

[22] Filed: Feb. 11, 1993

[30] Foreign Application Priority Data

May 27, 1992 [ZA] South Africa .................. 92/3894

[51] Int. Cl.⁶ ............................................. B24D 5/00
[52] U.S. Cl. .................................... 451/540; 451/542; 451/543; 407/9; 407/33; 407/66
[58] Field of Search ............... 451/540, 541, 542, 543, 451/547; 407/9, 33, 66

[56] References Cited

U.S. PATENT DOCUMENTS

| | | |
|---|---|---|
| 2,575,438 | 11/1951 | Alexander . |
| 2,628,821 | 2/1953 | Alexander et al. . |
| 2,724,222 | 11/1955 | Jeppson ................ 51/206.4 |
| 2,937,433 | 5/1960 | Rusinoff ................ 407/33 |
| 2,972,287 | 2/1961 | Rusinoff ................ 407/33 |
| 3,006,424 | 10/1961 | Vilhelm et al. . |
| 3,540,537 | 11/1970 | Brown . |
| 3,749,190 | 7/1973 | Shipman . |
| 3,805,364 | 4/1974 | Gardner . |
| 4,199,035 | 4/1980 | Thompson . |
| 4,271,917 | 6/1981 | Sahley . |
| 4,445,580 | 5/1984 | Sahley . |

FOREIGN PATENT DOCUMENTS

| | | |
|---|---|---|
| 0032428 | 7/1981 | European Pat. Off. . |
| 2609750 | 7/1988 | France . |
| 558200 | 8/1932 | Germany .................. 57/206.5 |
| 3637456 | 5/1988 | Germany . |
| 448821 | 7/1936 | United Kingdom . |
| 707021 | 4/1954 | United Kingdom . |

Primary Examiner—Maurina T. Rachuba
Attorney, Agent, or Firm—Scully, Scott, Murphy & Presser

[57] ABSTRACT

An abrasive tool such as a drill bit has a body with a working face (10). Undercut recesses (12) are formed in the working face (10). Cutting inserts (16) which present working ends (20) are located in the recesses (12). Locking means (24) in the recesses engage between the undercuts (14) and formations (22) on the inserts (16). This locks the inserts (16) against withdrawal from the recesses (12).

10 Claims, 2 Drawing Sheets

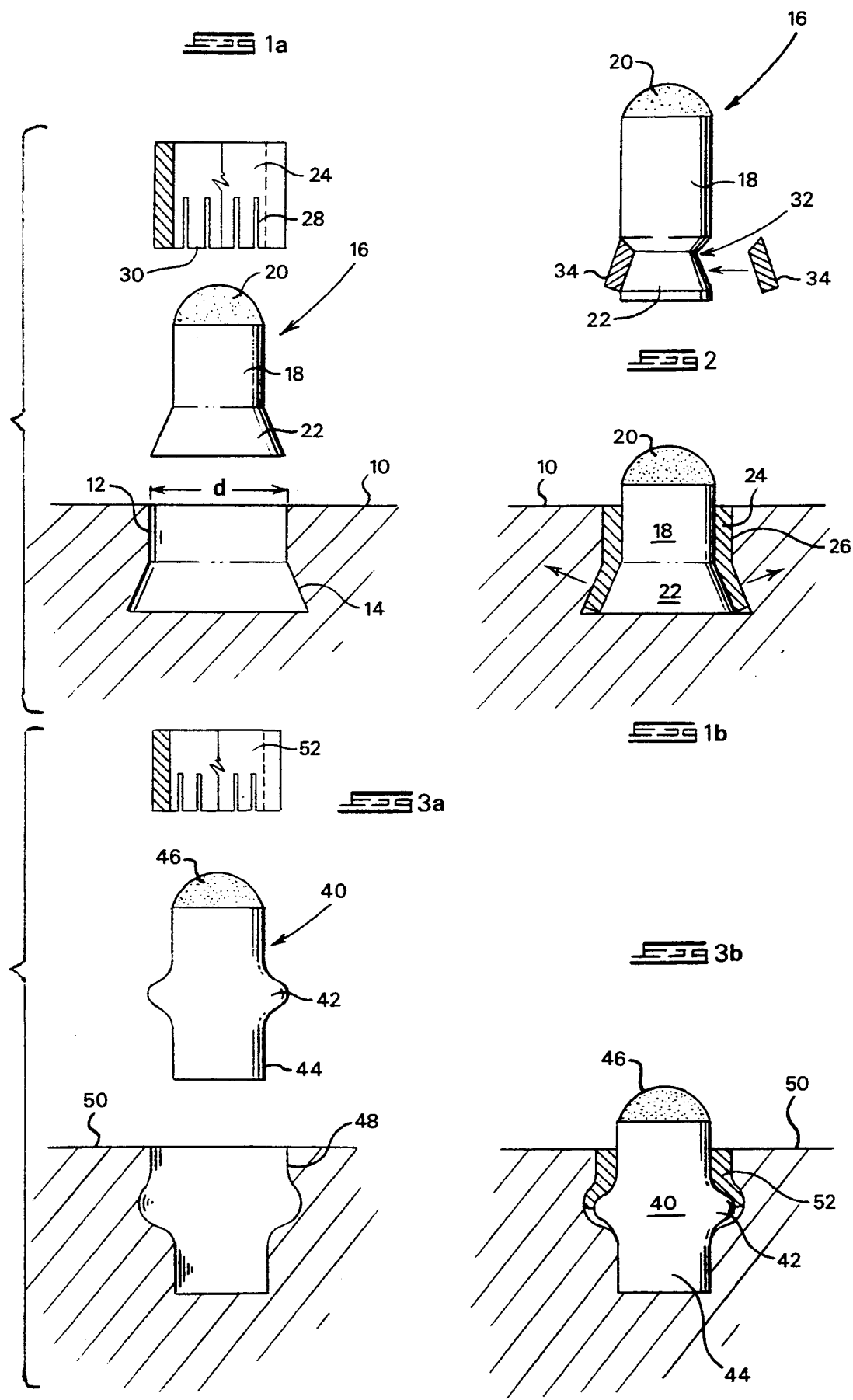

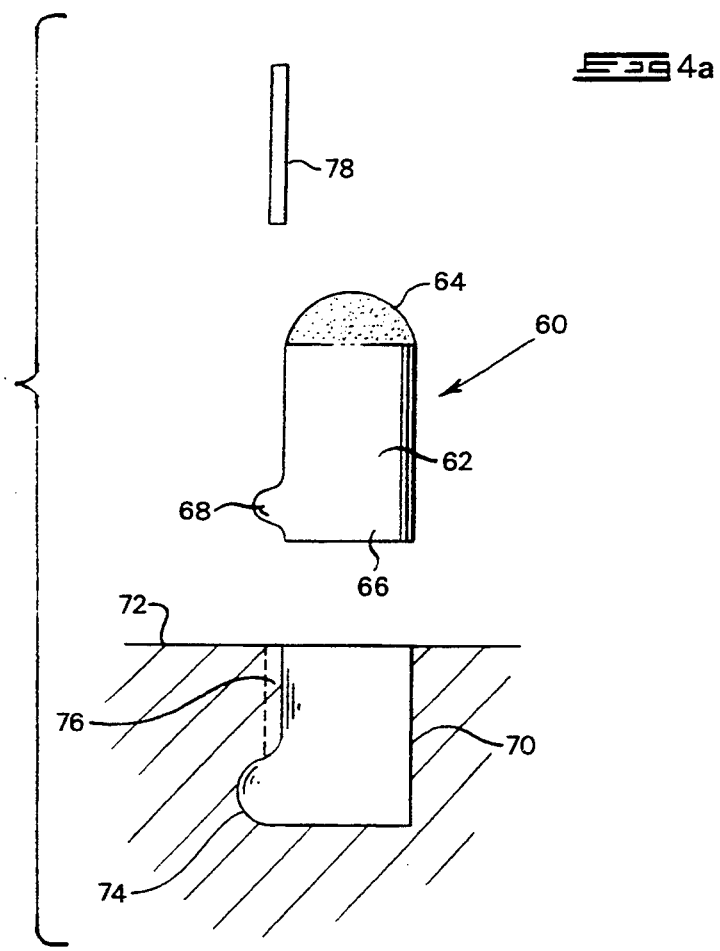
FIG 4a
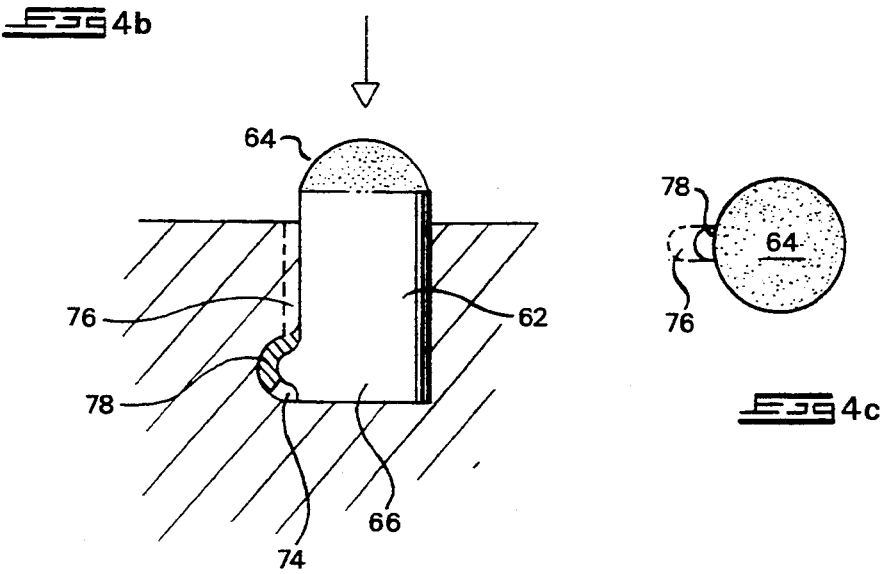
FIG 4b
FIG 4c

ABRASIVE TOOLS

BACKGROUND TO THE INVENTION

THIS invention relates to abrasive tools.

Abrasive tools are known that comprise a body in which are mounted inserts which have a wear-resistant or abrasive layer. It is this layer that is used to perform a cutting or abrading action. The support for the wear-resistant layer may be in the form of a post of squat proportions. It is the mounting of the post in the working face of the tool body that can present problems to the manufacturer and the user. Until now, such posts have been secured to the body by providing a suitable complementally shaped recess or socket in the working face, locating the post therein and brazing the post to the sides of the socket or recess by means of a suitable braze alloy. Most commonly, the post and the recess are cylindrical.

A disadvantage of this method is that residual stresses are induced at the circumferential region of the post at the area where maximum bending stresses also arise in use. These stresses are of the same order of magnitude as the strength of the braze alloy.

Another disadvantage is that the high temperatures required in the brazing cycle tend to cause deterioration of the post, which is usually made of a carbide, and also of the abrasive layer. This is especially so when the abrasive layer is composed of a diamond composite that is not thermally stable.

It may also happen that the impacts to which the tool are subjected in use may cause sufficient rise in temperature to lead to melting of the braze and consequent failure of the bond.

Another method has been to shrink fit the post so that it is mechanically held in the recess or socket. The socket may be suitably tapered with its cross section decreasing with increasing depth into the body.

SUMMARY OF THE INVENTION

A first aspect of the invention provides an abrasive tool comprising a body having a working face, at least one recess which is formed in the working face and which has at least one side and a wide portion extending beyond the side, a cutting insert which presents a working end and which is located in the recess, and locking means in the recess that engages the wider portion of the recess and the insert, thereby to lock the insert against withdrawal from the recess.

Typically each recess includes an undercut which forms the wider portion.

In preferred versions of the invention, the locking means comprises a deformable locking insert which has been forced into the recess between the recess and the cutting insert so as to engage between the undercut and the formation on the cutting insert.

In one preferred embodiment, the undercut is conically shaped, the cutting insert has a conically shaped foot portion received in the undercut and the locking means comprises a tubular sleeve forced into a position of engagement between the undercut and the foot.

In another embodiment, the cutting insert includes a relatively enlarged waist, the recess includes an annular undercut and the locking means comprises a tubular sleeve forced into a position of engagement between the undercut and the waist.

In yet another embodiment, the cutting insert includes a laterally projecting portion, the recess includes a lateral enlargement and the locking means comprises; a strip insert forced into a position of engagement between the laterally projecting portion and the lateral enlargement. In this case, the recess may include a groove in its side wall serving as a keyway for the laterally projecting portion of the cutting insert.

Each of the embodiments summarised above may comprise anti-rotation means to prevent rotation of the cutting insert in the recess. Typically, the anti-rotation means comprises a key on the cutting insert and a keyway in the recess, or vice-versa.

Another aspect of the invention provides a method of securing a cutting insert to the working face of an abrasive tool which has an undercut recess for receiving the cutting insert, the method comprising the steps of:

a) inserting, into the undercut recess, a cutting insert which has a lateral formation thereon, and b) engaging locking means between the undercut and the lateral formation of the cutting insert, thereby to lock the cutting insert against withdrawal from the recess.

Step b) may comprise locating a deformable locking insert between the cutting insert and the recess and causing the locking insert to deform into a position of engagement between the undercut and the lateral formation of the cutting insert. Conveniently, the locking insert is in the form of a tubular sleeve and the locking insert is caused to deform into the position of engagement by application of force thereto using a tubular punch.

BRIEF DESCRIPTION OF THE DRAWINGS

The invention will now be described in more detail, by way of example only, with reference to the accompanying drawings.

In the drawings:

FIGS. 1a and 1b show exploded and assembled sectional side views respectively of a portion of an abrasive tool of the invention;

FIG. 2 illustrates a second embodiment of the invention in a partially exploded view;

FIGS. 3a and 3b show views corresponding to those of FIG. 1 but of a third embodiment of the invention;

FIGS. 4a and 4b show views corresponding to those of FIG. 1 but of a fourth embodiment of the invention; and FIG. 4c shows a view looking in the direction of the arrow in FIG. 4b.

DESCRIPTION OF EMBODIMENTS

This invention has particular application to drill bits wherein the inserts are studcutters. The studcutter may be any one of various shapes in cross section, including but not limited to square, oval or rectangular or even combinations thereof.

The working end may be of various shapes from flat cylindrical to oval or bullet-shaped and may contain indentations or be discontinuous.

The recesses shaped to accommodate the studcutter may be cast in the working surface of the drill crown or may be machined using a dovetail cutter in a milling machine, such as a CNC (computer numerically controlled) milling machine. Alternatively, round undercut holes may be made with a conventional adjustable boring head fitted to any suitable milling machine.

A first embodiment of the invention will now be described with reference to FIGS. 1a and 1b of the drawings.

With reference to FIG. 1a, the working face 10 of a drill crown contains a recess 12 which has been undercut to form a flared, in this case conically shaped portion 14 of expanded cross section. At the working face 10, the recess 12 has a diameter of dimension d. A studcutter 16 has a post with a cylindrical portion 18, carrying an abrasive working end 20, and a conically shaped foot 22 at the other end. The diameter of the foot is no larger than the diameter d and is preferably slightly less.

In assembling the drill bit, the studcutter 16 is located in the recess 12, foot first, so that the foot 22 locates in the flared portion 14 of the recess. It will be noted that the relative dimensions of the recess and of the studcutter post are such that a vacant space is left between the studcutter post 18 and the walls 26 of the recess.

Thereafter, a deformable sleeve 24 is positioned around the studcutter and is forced axially into the recess 12. With the application of sufficient force, the lower portion of the sleeve 24 is caused to expand around the foot 22 of the studcutter. In practice, force is applied to the sleeve by means of a tubular punch which presses against the upper edge of the sleeve and drives the sleeve in a direction into the recess 12.

To facilitate expansion of the lower portion of the sleeve 24, saw cuts 28 are formed in the wall of the sleeve from its leading end 30. The sleeve material will typically be a relatively pliable material such as mild or stainless steel or a plastics material, so that it can be made to deform in a manner to conform to the shape of the space existing between the wall of the recess and the studcutter post.

The studcutter assembly is shown in assembled form in the working face of the drill bit in FIG. 1b. The lower portion of the sleeve 24 has expanded to surround the foot 22 of the studcutter 16 and occupy the undercut, flared portion 14 of the recess 12.

In this position, the sleeve 24 serves to lock the studcutter in the working face 10 with its working end 20 exposed and standing proud of the working face. Any force exerted applied to the studcutter in a direction to pull it from the drill crown will result merely in forces, indicated by the arrows in FIG. 1b, being applied to the wall of the recess. The wall 26 exerts opposing forces on the studcutter and sleeve, thereby locking them in position in the recess.

The studcutter secural method illustrated by FIG. 1a and 1b was tested in the laboratory for impact and torque resistance. The test for impact resistance was performed using a standard Izod impact tester made by Avery. Using the Izod tester, a pendulum-suspended impactor chisel was swung transversely so as to impact against the upstanding portion of the studcutter post. In each case, the studcutter post was machined to have a flat surface against which the corresponding flat surface of the impactor chisel could strike fully. The pendulum was given 300J of kinetic energy for each blow against the cutter post.

Three conventional brazed assemblies were tested alongside four assemblies according to FIG. 1a and 1b and measurements were made of the energy required to break the studcutter post. The post of the three conventional assemblies broke on absorption of 18J, 22J and 23J respectively. Of the four assemblies of the present invention, two of the posts fractured at 47J and 110J respectively. Even though impacted twice, the other two posts could not be broken at all, indicating that these posts could twice absorb the full 300J of available energy without fracture.

Overall it was clear that studcutter posts secured in accordance with the technique proposed in FIG. 1a and 1b showed a far higher impact resistance than the conventionally brazed studcutter posts.

Torque resistance tests were performed using a torque wrench with a suitable adaptor to engage the studcutter post, and measurements were made of the torque required to rotate the post in its mounting.

In a test on a conventionally brazed studcutter post, no rotation was observed at a torque of 450 Nm. In a corresponding test on a studcutter post mounted in accordance with FIGS. 1a and 1b, rotational slippage was observed at 140 Nm. This indicated the desirability of anti-rotation devices in the technique of FIGS. 1a and 1b if high levels of torsional resistance are considered necessary.

A second embodiment of the invention is shown in FIG. 2. In this case, the studcutter 16 has a post 18 with an end section 22 and a reduced diameter neck section 32. In practice, the illustrated shape is achieved by appropriate machining of the cylindrical post of a conventional bullet-shaped studcutter. Collets 34 are secured to the post 18 in the region of the neck section and create a flared foot for the post as illustrated. The collets may be secured in the illustrated positions by means of a suitable adhesive.

The embodiment of FIG. 2 is then secured in a recess in the working face of a tool by means of a sleeve like the sleeve 24 used in the first embodiment. As before, the studcutter is therefore locked against withdrawal from the recess. Once again, it is anticipated that anti-rotation measures will be required if high levels of torsional resistance are to be provided.

A third embodiment of the invention is illustrated in FIGS. 3a and 3b. Referring to these Figures, the post of a studcutter 40 has a thickened waist portion 42 between its end 44 and the abrasive working end 46. The recess 48 in the working face 50 of a drill bit has a similar shape.

In use, the studcutter post is inserted into the recess 48 and an expandable sleeve 52, similar to the sleeve 24 of the first embodiment, is then forced into position around the post 40 and the thickened waist portion 42 to lock the studcutter post in the recess.

As in previous embodiments, it is expected that anti-rotation measures will be necessary if high levels of torsional resistance are to be provided.

A fourth embodiment of the invention is illustrated by FIGS. 4a, 4b, and 4c. Referring to these Figures, a studcutter 60 has a post 62 having an abrasive working end 64. Close to the opposite end 66 is a projection 68. A recess 70 formed in the working face 72 of a drill bit includes an enlargement or "bubble" 74 formed at its lower end. The bubble 74 is shaped to accommodate the projection 68 on the post 62. A groove 76 extends from the working face 72 to the bubble 74.

In use, the studcutter post 62 is inserted into the recess 70. During the insertion process the groove 76 acts as a keyway to guide the projection 68 into the bubble 74. Thereafter a strip insert 78 is forced down the groove 76 and around the projection 68, as shown in FIG. 4b, to lock the studcutter post in the recess.

In this embodiment, the engagement between the projection 68 and the bubble 74, via the insert 78, acts to prevent rotation of the studcutter post in the recess.

Thus this embodiment can be expected to have a higher torsional resistance than the earlier embodiments.

It will be appreciated that it would be a simple matter to include an anti-rotation device of the type illustrated in FIGS. 4a to 4c in the embodiments described previously, or in fact other anti-rotation measures, if high levels i of torsional resistance are necessary in a particular application.

Note that the exposed top surface of the sleeve or strip in the relevant embodiments can be provided with an abrasive protective layer. Note also that the abrasive working end of each cutting insert is preferably provided by a diamond compact.

I claim:

1. An abrasive tool comprising a body having a working face, at least one recess which is formed in the body and which extends from a predetermined depth to the working face, the recess having at least one side and, at a localized position along the length of the recess within said body, includes an undercut which extends outwardly beyond the side, a cutting insert which presents a working end extending beyond said working face and which is located in the recess, the cutting insert having a laterally outwardly extending projection located along its length within said recess at a localized position aligned with the undercut in the recess, said recess being dimensioned so as to define a space between said side of the cutting insert extending towards said working face of the body, and a deformable locking insert being forced into the space between the recess and said cutting insert so as to cause at least a portion of said locking insert to expand and engage between the mutually aligned projection of the cutting insert and the undercut of the recess to thereby lock the insert against withdrawal from the recess.

2. An abrasive tool according to claim 1 wherein the undercut is conically shaped, the cutting insert having a lateral projection in the form of a conically shaped foot portion located in the recess aligned with the undercut, and the locking insert is a deformable tubular sleeve forcibly deformed into a position of engagement between the undercut and the foot portion.

3. An abrasive tool according to claim 1 wherein the conically shaped foot portion of the cutting insert is enlarged relative to the remainder of the cutting insert.

4. An abrasive tool according to claim 1 wherein the lateral projection of the cutting insert is in the form of a relatively enlarged waist, the recess including an annular undercut and the locking insert is a tubular sleeve forcibly deformed into engagement between the undercut and the waist.

5. An abrasive tool according to claim 1 wherein the cutting insert includes a laterally projecting portion in the form of a localized protrusion, the recess including a localized lateral enlargement corresponding to the protrusion, and the locking insert is a deformable strip forcibly deformed into engagement between the protrusion and the lateral enlargement.

6. An abrasive tool according to claim 5 wherein the recess includes a groove in its side which extends from the working face to the lateral enlargement of the recess, the groove serving as a keyway for the protrusion of the cutting insert during insertion thereof into the recess.

7. An abrasive tool according to claim 1 wherein the deformable locking insert comprises a sleeve having a tubular wall with slots cut into one end thereof.

8. An abrasive tool according to claim 1 wherein the abrasive tool is a drill bit having a plurality of cutting inserts in the form of studcutters locked in recesses in a working face of the drill bit.

9. A method of securing a cutting insert to the working face of an abrasive tool which has a recess for receiving the cutting insert, said recess being dimensioned so as to provide a space between said recess and said cutting tool to a predetermined depth of said recess, the method comprising the steps of:

(a) inserting the cutting insert into the recess in such a manner that a lateral projection formed on said cutting insert at a localized position along the length of the cutting insert, is aligned with a laterally outward extending undercut formed at a localized position in the depth of the recess, and (b) forcibly deforming a locking insert into the space provided between the recess and the cutting insert so that at least a portion of the locking insert is deformed so as to expand into the space between the lateral projection of the cutting insert and the undercut of the recess and to thereby lock the cutting insert against withdrawal from the recess.

10. A method according to claim 9 wherein the locking insert is in the form of a tubular sleeve and the locking insert is caused to deform into the position of engagement by application of force thereto using a tubular punch.

* * * * *

UNITED STATES PATENT AND TRADEMARK OFFICE
CERTIFICATE OF CORRECTION

PATENT NO. : 5,423,719
DATED : June 13, 1995
INVENTOR(S) : Bernard A. Jennings

It is certified that error appears in the above-indentified patent and that said Letters Patent is hereby corrected as shown below:

```
        Column 2, line 56:   "not, limited"   should
read --not limited--
        Column 3, line 17:   "Such"  should read --such--
        Column 5, line 7:    delete "i"
        Column 5, line 43, Claim 3:   "claim 1"  should
read --claim 2--
```

Signed and Sealed this

Thirteenth Day of February, 1996

Attest:

BRUCE LEHMAN

*Attesting Officer*     *Commissioner of Patents and Trademarks*